United States Patent [19]

Schwartz

[11] 4,154,902

[45] May 15, 1979

[54] ELECTRIC BATTERY CELL, SYSTEM AND METHOD

[75] Inventor: Ralph E. Schwartz, Canelo, Ariz.

[73] Assignee: American Energizer Corporation, Sierra Vista, Ariz.

[21] Appl. No.: 722,548

[22] Filed: Sep. 13, 1976

[51] Int. Cl.² ............................................ H01M 8/18
[52] U.S. Cl. ...................................... 429/15; 429/21; 429/105; 204/2.1
[58] Field of Search ................... 424/15, 49, 105, 188, 424/189, 194, 218, 21; 204/2.1

[56] References Cited

U.S. PATENT DOCUMENTS

| 3,121,028 | 2/1964 | Story | 429/105 |
| 3,567,515 | 3/1971 | Maricle et al. | 429/105 |
| 3,592,698 | 11/1968 | Baba | 429/15 |
| 3,844,837 | 10/1974 | Bennion et al. | 204/2.1 |
| 3,898,097 | 8/1975 | Fraioli | 429/103 |

*Primary Examiner*—Donald L. Walton
*Attorney, Agent, or Firm*—Flehr, Hohbach, Test, Albritton & Herbert

[57] ABSTRACT

An ambient temperature electric cell of primary and secondary nature, characterized by the use of the dithionite salt of an active (alkali or an alkaline earth) metal as the charging agent, and including processes for manufacturing and for operating the same. The dithionite salt is dissolved and suspended in an anhydrous electrolyte comprised of a suitable solvent, which may also contain another salt of the same active metal and may be saturated with sulfur dioxide. To form the cell, a sealed and evacuated enclosure having a negative electrode and a positive current gathering electrode is filled with the electrolyte and subjected to a charging current sufficient to plate the active metal onto the negative electrode, while the positive electrode is saturated with sulfur dioxide. In the case of a secondary cell, the dithionite produced upon discharge is available as a partially dissolved and suspended salt in the electrolyte. Such availability may be enhanced by a system for forced circulation of the electrolyte. In the case of a primary cell, the final cell potential and discharge characteristics may be enhanced by replacing the dithionite electrolyte with other anhydrous electrolyte solutions (e.g., sulfuryl chloride or thionyl chloride) once the lithium has been plated out. The cell is characterized by extremely low internal resistance, long shelf life and excellent performance over a wide temperature range.

72 Claims, 6 Drawing Figures

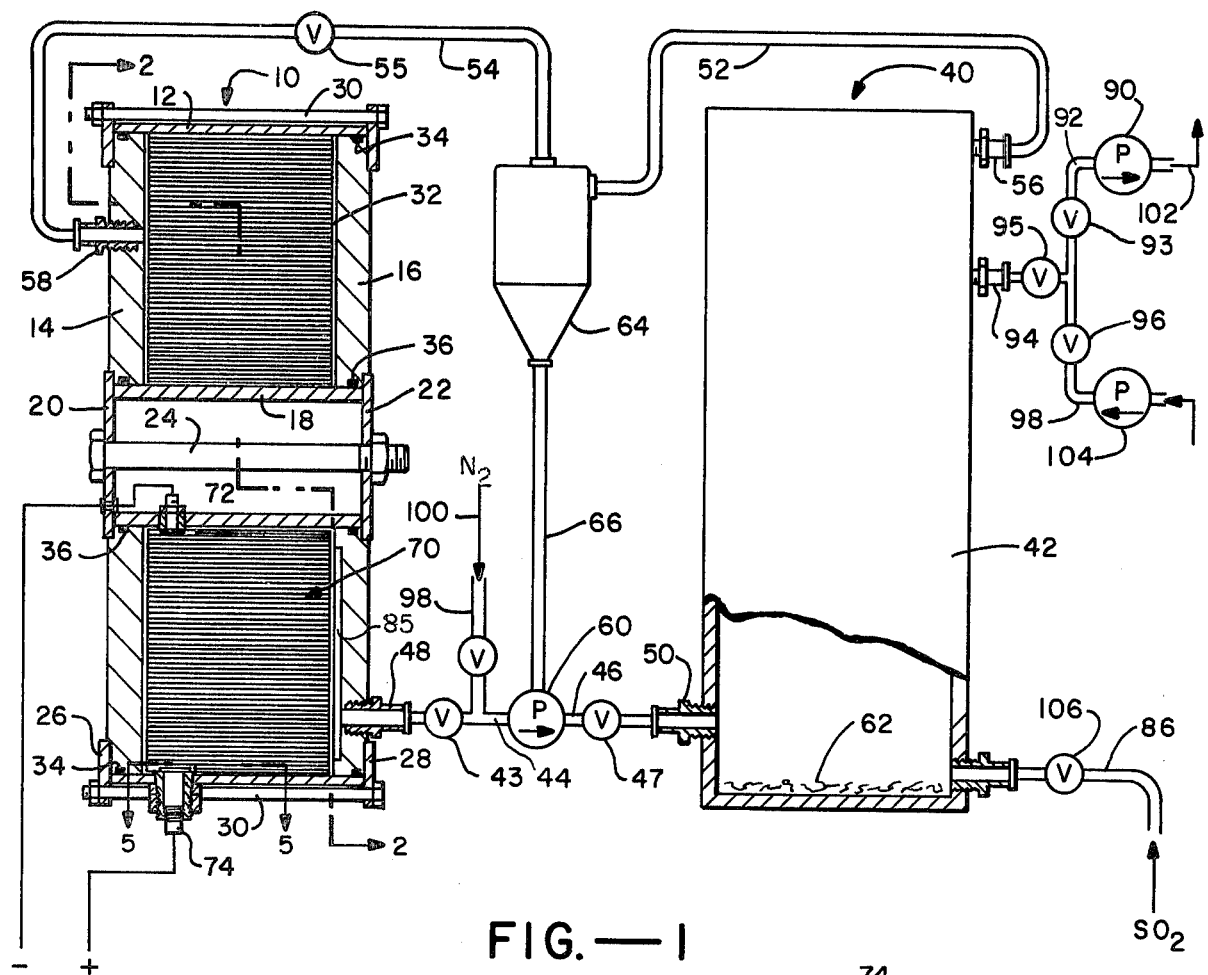
FIG.—1
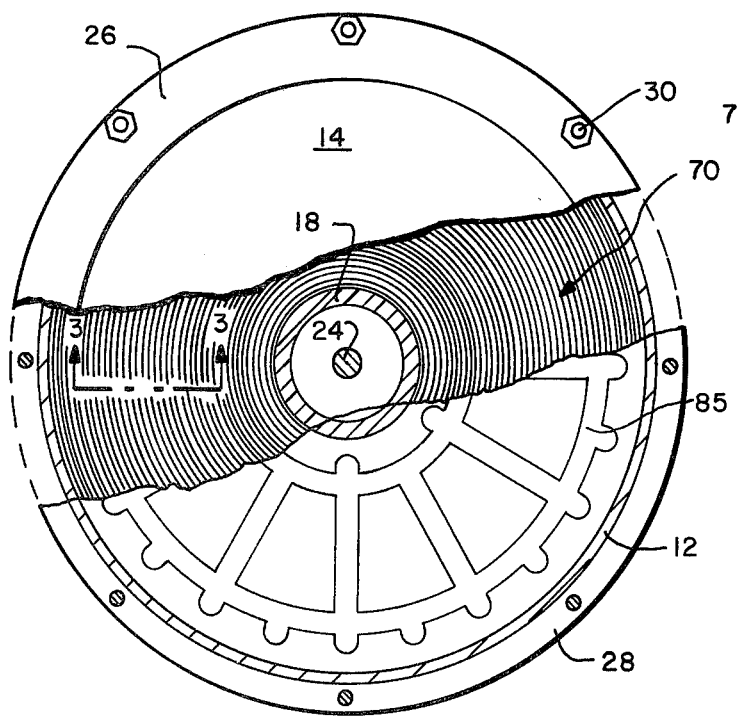
FIG.—2
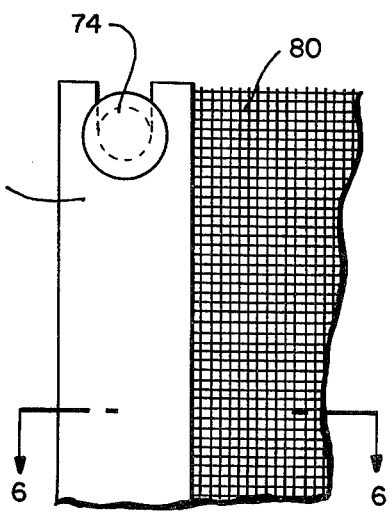
FIG.—5
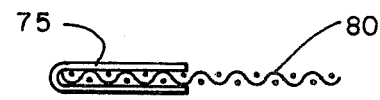
FIG.—6

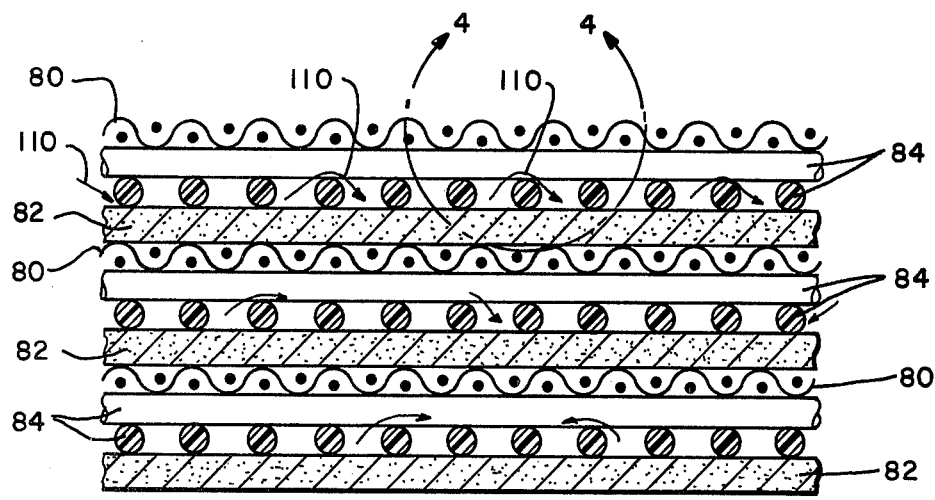
FIG—3
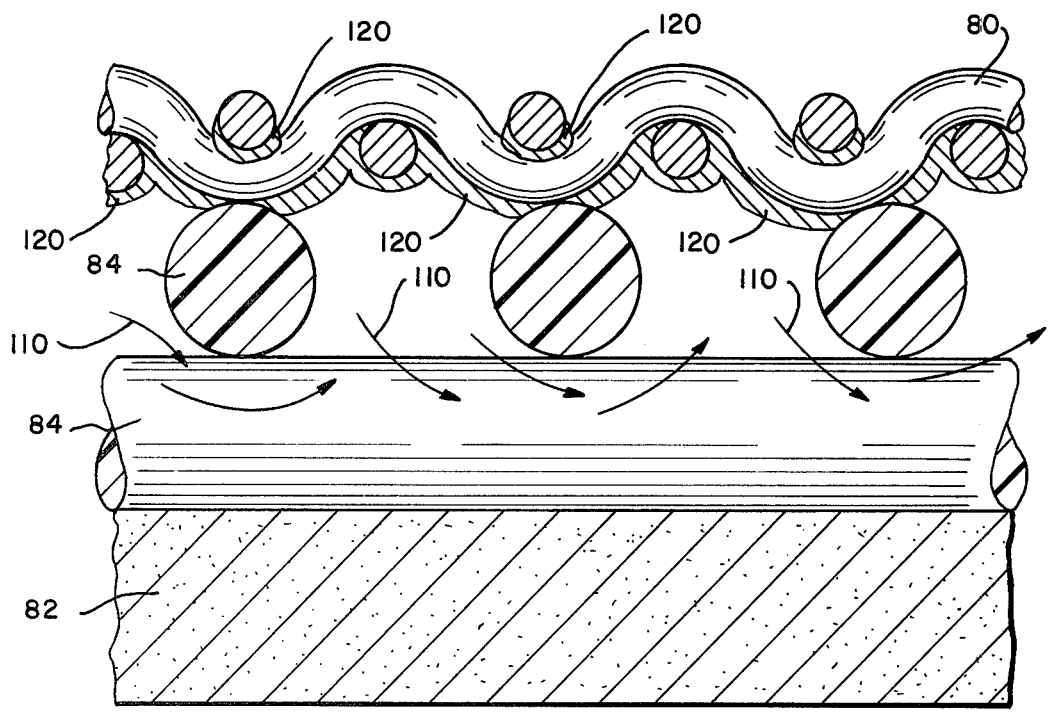
FIG.—4

ELECTRIC BATTERY CELL, SYSTEM AND METHOD

BACKGROUND OF THE INVENTION

It is generally known that conventional primary and secondary electric cells and batteries are subject to serious limitation on their use where substantial power is required, for example, as a power source for automobiles or for the propulsion of marine craft such as submarines. Widely used lead-acid batteries of the automobile industry are sturdy and generally dependable but have power/weight ratios which are far too low for the substantial power requirements for propulsion. This is also true of zinc type batteries and other commercially available electric cells. In general, the problem is to achieve energy density (watt hrs./lb.) and power density (watts/lb.) ratios in an electric cell or battery, which will be of such order as to meet the necessary power requirements.

Significant improvements in energy and power densities can be obtained by replacing the dense, high atomic weight metals, such as lead, with the less dense, low atomic weight alkali (lithium, sodium, potassium) and alkaline earth (magnesium, calcium) metals. These active metals react rapidly with water and thus a suitable non-aqueous solvent must be used. This often leads to a moderate saving in weight in that most nonaqueous solvents are less dense than water. Electric cells based on use of these materials, theoretically at least, enable substantially higher power/weight ratios to be obtained than in the more conventional batteries. By way of illustration, a complete lithium battery should be capable of achieving current and energy density ratios of the order of ten to 20 times that obtained with the conventional lead-acid battery. However, to date, and despite the obvious benefits to be obtained, no widely successful battery or electric cell has been developed wherein the lighter active metals are utilized. In general, these active metals are so reactive, particularly in the presence of moisture or atmospheric air (including nitrogen as well as oxygen), that they not only present hazards but also require expensive equipment and handling procedures for their use. By way of illustration, known lithium sulfur dioxide batteries are not only excessively expensive to fabricate (principally because of the problems in handling the metallic lithium), but also suffer the further difficulty that they are not designed to be rechargeable.

A further particular problem commonly encountered in electric cells and batteries, is a high degree of inherent internal resistance to current flow. This internal resistance leads to overheating and consequent ineffectiveness of the battery in use, as evidenced by the well know "burn out" under conditions of severe or continued loading.

Based on the foregoing, it will be apparent that the development of an improved battery cell and system is greatly to be desired, particularly as respects present limitations on maximum energy and power density ratios obtainable in current cells, the relatively low power/weight ratios available, and the difficulties associated with handling highly reactive but potentially highly successful electrode materials.

SUMMARY OF THE INVENTION

This invention relates generally to high energy battery cells of primary and secondary nature, and more particularly to an ambient temperature active metal cell wherein a dithionite salt of the active metal is used as a charging agent. It specifically relates to a secondary battery system utilizing an anhydrous solvent containing freshly dissolved lithium dithionite as part of the electrolyte.

In general, it is an object of the present invention to provide a new and improved primary or secondary cell based on use of active metal dithionites or mixtures thereof as a charging agent.

A further object of the present invention is to provide primary and secondary cells of the type described which achieve maximum power/weight ratios, through use of active metals of low atomic weight, such as lithium, sodium, potassium, magnesium and calcium.

A still further object of the invention is to provide new methods for both manufacturing and operating such improved primary and secondary cells, which enable effective use while avoiding the risks and difficulties of handling the specified, highly reactive metals.

A still further and specific object of the invention is to provide improved primary or secondary cells of the above character which make possible power/weight ratios sufficient to meet the power requirements for propulsion of primary vehicles and marine craft, such as automobiles, trucks, power boats and submarines.

As a brief statement of the invention, active metal cells of primary and secondary nature have been developed, making use of dithionite salts of an active metal as the charging agent, which are not only capable of use at ambient temperature but which also avoid the risks and difficulties normally encountered in the use of highly reactive metals. More specifically, the electrolyte in contact with the electrode is comprised of a suitable anhydrous solvent in which the active metal dithionite is dissolved. The electrolyte may additionally contain an additional source of ions in the form of a salt of the same active metal and also may be saturated with sulfur dioxide.

In a particular secondary battery system according to the invention, the electrolyte is circulated through a highly porous inert spacer between a negative electrode and a positive current gathering electrode, in a sealed and evacuated cell. The system is subjected to a charging current of an energy level sufficient to plate the active metal (e.g., lithium) on the negative electrode while releasing the sulfur dioxide at the positive electrode to further saturate the electrolyte. A continuous supply of electrolyte containing freshly dissolved dithionite is obtained through use of an auxiliary dissolving chamber in conjunction with solids separator (e.g., centrifugal separator), thus enabling use of anhydrous solvents in which the dithionite is only slightly soluble (e.g., acetonitrile, dimethyl sulfoxide). The performance of the battery system can be enhanced by use of a salt of the same active metal (e.g., lithium perchlorate) as part of the electrolyte, and as a source of additional active metal. In another system the slightly soluble active metal dithionite is physically held near or in a porous electrode so as to be readily available for consumption during charging. On discharge, the dithionite salt is reformed in or near the porous electrode for subsequent consumption during recharge.

Secondary cells as herein described (based on use of a dithionite salt of an active metal as the charging agent) are characterized by substantially increased power and energy density ratios, as compared to conventionally available secondary cells. By way of illustration, power/weight ratios of the order of ten times, or higher, than those obtained with the conventional lead-acid battery, are possible. Due to low internal resistance, the time required for recharging the battery will also be greatly reduced, for example, of the order of one-fifth the time required in an equivalent lead-acid cell. Besides extremely low internal resistance to current flow, other particular advantages of the cells include an unusually long shelf life, extremely good performance over a wide range of high and low temperatures, and a negligible depletion of the active dithionite, despite prolonged continuous use of the battery system.

The invention further contemplates the assembly and satisfactory use of primary cell systems, by charging cells containing active metal dithionites in nonaqueous electrolyte solutions, thus plating the active metals inside the cell. This eliminates the need to deal with the active metals as such. The final cell potential and discharge characteristics can be modified by replacing the charging electrolyte with other anhydrous electrolyte solutions, for example, electrolyte solutions employing or containing, specifically, sulfuryl chloride and thionyl chloride.

Other features and advantages of the invention will be apparent from the following description taken in conjunction with the drawing.

BRIEF DESCRIPTION OF THE DRAWINGS

FIG. 1 is a view in section and elevation of one embodiment of a secondary battery cell and system, in accordance with the present invention.

FIG. 2 is a view in section, along the line 2—2 of FIG. 1.

FIG. 3 is an enlarged sectional view along the line 3—3 of FIG. 2.

FIG. 4 is a greatly enlarged detail view of the indicated portion of FIG. 3.

FIG. 5 is an enlarged detail view along the line 5—5 of FIG. 1.

FIG. 6 is a view in section along the line 6—6 of FIG. 5.

PRACTICAL AND THEORETICAL CONSIDERATIONS

In order for a secondary battery to be rechargeable, both the anode and cathode reactions must be chemically reversible. In order to be a practical secondary cell, these reactions must also take place rapidly. It is known that the reduction of the active metal ions to the metals and subsequent oxidation of these metals, and particularly the lithium metal/lithium ion reaction, satisfies both of these conditions and, moreover, must be carried out in nonaqueous solvents which provide the further advantage of lower density solutions as compared to aqueous solutions. The metal ion reactions of other alkali metals and alkaline earth metals (viz., columns IA and IIA of the periodic table, herein "active metals") also satisfy the desired conditions.

Theoretical considerations related to an alkaline metal/sulfur dioxide battery suggest that $SO_2$ will be reduced to $S_2O_4^{--}$ (dithionite) as the battery is discharged. It is further postulated that a satisfactory battery can be produced by dissolving an active metal dithionite (e.g., $Li_2S_2O_4$) in a nonaqueous solvent to produce the active metal and dithionite ions in solution (e.g., $Li^+$ and $S_2O_4^{--}$). By passing a charging current through the solution containing such ions, the active metal (e.g., Li) will be deposited at one electrode and $SO_2$ gas will be released at the other. The advantage is a procedure for employing the highly reactive metals in solution without appreciable risk or difficulty in handling, while at the same time releasing sulfur dioxide gas to saturate the electrolyte.

To verify the foregoing concept with respect to the preferred active metal, lithium, lithium dithionite ($Li_2S_2O_4$) is prepared by the technique of ion exchange. Specifically, a column of cation exchange resin in the hydrogen ion ($H^+$) form is converted completely to the lithium ion ($Li^+$) form by passing a concentrated aqueous solution of lithium chloride through the column until the effluent is essentially neutral. The column is rinsed with deionized water until the excess lithium chloride is removed, as indicated by the absence of red lithium ion color in a flame test on the effluent. An aqueous solution of commercial sodium dithionite ($Na_2S_2O_4$), which has been deoxygenated by bubbling it with nitrogen or other inert gas, is then passed through the column. The effluent is collected in deoxygenated ethanol until a flame test on the effluent indicates the presence of sodium ion. The lithium dithionite is next precipitated from the ethanol, and is further washed with deoxygenated ethanol, filtered and vacuum dried. The lithium dithionite ($Li_2S_2O_4$) thus produced is relatively stable when dry and maintained at room temperature. However, it will rapidly decompose at temperatures near 200° C., and also reacts rapidly with oxygen when damp or in solution. The ultraviolet spectrum of the dithionite ion ($S_2O_4^{--}$) is used to determine the presence and purity of the lithium metal dithionite. While the active metal dithionites are found to be appreciably soluble only in water, limited solubility (less than about 5%) can be achieved in such anhydrous solvents as acetonitrile and dimethylsulfoxide, among others.

To test the concept, a battery cell can be prepared wherein the electrolyte comprises a suitable nonaqueous solvent, (i.e., acetonitrile) and wherein the lithium dithionite is present as a slurry. In one satisfactory cell, a lithium salt is also present, preferably in the form of a saturated solution, and functions both as an electrolyte and as a source of additional lithium ion. As tests in aqueous solution show that the perchlorate and dithionite ions do not react, a saturated solution of lithium perchlorate in acetonitrile is satisfactorily utilized for such purpose, in the cells just described. Various conductive metals can be used for the negative electrode, including the noble metals (gold and silver), aluminum, copper and certain stainless steels. Conductive materials such as finely divided carbon and sintered aluminum can be used as the positive current gathering electrode. When current is passed through these cells, lithium is plated at the negative electrode, whereas sulfur dioxide gas is generated at the other electrode. When the charging current is discontinued, a constant stable voltage is observed. Such cells with electrode areas of about 15 square centimeters are capable of lighting 0.5 ampere bulbs for some time. When the bulb is disconnected, the voltage returns to its open circuit voltage. When the cell is completely discharged, it is found to be rechargeable many times. Although the cells can be alternatively operated with the addition of $SO_2$ gas, the behavior of the cells is essentially independent of the presence of the added $SO_2$ gas. However, when the lithium dithionite is omitted from the electrolyte, the cells fail to charge and produce current.

Successful use of the dithionite salt of an active metal as the charging agent in a secondary battery cell has led to the development of a full scale cell suitable for providing power to a primary propulsion system, for example, in a submarine or automobile. A specific embodiment of such cell, as used in a battery system, is described below.

DESCRIPTION OF PREFERRED EMBODIMENT

Referring to FIG. 1, reference numeral 10 generally represents a self-contained battery cell or unit in accordance with the present invention. This cell is cylindrical in configuration and includes an outer cylindrical shell 12 and two generally circular side plates 14 and 16. The side plates and outer shell are assembled in leaktight fashion upon an axial tube 18 which forms a central core for the unit. Assembly is accomplished by means of a pair of inner circular retaining washers 20, 22, which are held in place by suitable fastening means such as the bolt 24, and a pair of outer circular retaining flanges 26 and 28 which are held in place by suitable peripheral fastening means such as a series of bolts 30. In the assembled condition, the outer casing provides the interior annular chamber or space 32, defined by the side plates 14, 16, the outer shell 12 and the inner core 18. Suitable inert sealing members such as the O-rings 34 and 36 are positioned between the described casing members to insure that the annular space 32 is completely sealed as respects the exterior environment. As hereinafter described, the space 32 generally forms a battery chamber for an electric cell including active (negative) and current gathering (positive) electrodes.

Associated with the battery chamber or cell 10 and forming part of the electrochemical current producing system of the present invention is a circulatory chamber 40. This chamber can take any suitable form such as a cylindrical tank 42 and, as hereinafter described, generally functions as a reservoir for circulating anhydrous electrolyte containing undissolved or partially dissolved active metal dithionite. In the illustrated apparatus, the circulatory chamber 40 is in fluid communication with the battery cell 10 through conduits 44 and 46 connecting an outlet 48 from the battery chamber to an inlet 50 of the circulatory chamber, and through additional conduits 52 and 54 connecting an outlet 56 from the circulatory chamber to an inlet 58 in the battery chamber. As hereinafter described, circulation of electrolyte and dissolved charge transfer agent is accomplished by pump means 60 which generally functions to withdraw spent electrolyte from the battery chamber 10, to pass the same over a supply of solid dithionite 62 in the circulatory chamber 40, and to return electrolyte with freshly dissolved dithionite from the circulatory chamber to the battery chamber. Thus, referring specifically to FIG. 1, the pump 60 is positioned between the conduits 44, 46 joining the battery and circulating chambers, and functions to force circulating slurry of electrolyte and dithionite to a solids separation device 64, from which electrolyte and dissolved dithionite is charged to the battery chamber through the line 54. Undissolved solid dithionite separated in the device 64 is returned to the tank 42 through the line 66, pump 60 and conduit 46. While any satisfactory solids separation device may be employed (e.g., a continuous rotary filter), a centrifugal separator is most conveniently employed in that such apparatus is capable of acting through fluid flow to both "separate" and return undissolved dithionite to the circulatory chamber and to deliver to the battery cell a clear "filtrate" of electrolyte containing dissolved dithionite.

Referring to FIGS. 1 and 2, an electric battery cell 70 is positioned within the chamber 10 so as to substantially fill the interior annular space 32. In general terms, the battery cell 70 includes an elongate active electrode of conductive meterial (negative electrode) arranged in adjacent configuration to an elongate passive current gathering electrode (positive electrode) such that a passage is provided therebetween for the flow of electrolyte solution. In the illustrative apparatus, this passage between the elongate electrodes is maintained by positioning highly porous inert spacing means between the adjacent electrodes so as to insure a continuous unobstructed pathway for the circulating electrolyte and dissolved charge transfer agent. In more specific terms, the two electrodes and intermediate spacing means are arranged in an increasing spiral configuration advancing from an inner electrode terminal 72, adjacent to central core 18, to an outer electrode terminal 74, adjacent the outer shell 12. The inner terminal 72 is connected to the active (negative) electrode whereas the outer terminal 74 is connected to the current gathering (positive) electrode. In each instance, the terminal is mounted within a leaktight sealing device 76, to maintain the sealed integrity of the battery cell 10.

The construction and adjacent configuration of the electrodes in the spiral arrangement of the battery cell 70, is shown in the sectional view of FIG. 3. In general, the conductive material of the active electrode, represented at 80, may comprise any suitable conductive materials, for example, a bare metal such as copper, certain stainless steels, aluminum and the noble metals. An elongate strip of perforated copper or copper screen is particularly suited for the purpose. The current gathering electrode, represented at 82, may likewise comprise any suitable conductive material, for example, finely divided carbon or graphite, sintered aluminum or the like. In general, the electrode 82 is formed as an elongate strip which is generally contiguous with the electrode 80. As previously noted, an elongate highly porous inert non-conductive spacer, represented at 84, is positioned between the electrodes 80 and 82. The construction of the spacer 84 should be such that the electrolyte is free to circulate through the battery cell and between the spaced electrodes, to thereby reduce internal resistance to current flow (and the potential for heat gain). While various inert spacing materials can be employed, inert plastic materials in open lattice form (e.g., crossed strands of polypropylene or like alkali resistant fiber-forming plastics) are to be preferred. In general, the inert spacing means should be insoluble in the anhydrous organic solvents used in the electrolyte solution, and capable of being formed in highly porous configurations of the type described. In general, the porous spacing member 84 provides for free flow of electrolyte through the cell 70 in the battery chamber 10. To enhance this electrolyte flow, suitable flow pathways 85 can also be provided on the inner surfaces of the side plates 14 and 16 (See FIG. 2).

With particular reference to the electrolyte solution, an essential component is a substantially inert anhydrous organic solvent for the active metal dithionite employed as the charging agent. Preferably, the electrolyte solvent will also have good properties as a medium for promoting reactions involving ionization. The solvent should also be substantially inert with respect to the selected conductive materials employed as electrodes, viz., copper, aluminum, carbon etc. The anhydrous electrolyte liquid should function as a satisfactory solvent for the selected active metal dithionite salt employed as the charging agent and, also, for sulfur dioxide gas. With respect to the preferred active metal dithionite, lithium dithionite, particularly satisfactory anhydrous organic solvents include acetonitrile, dimethylsulfoxide, diethylformamide, and to a lesser extent, propylene carbonate, and isopropylamine, among others. Because of the generally low solubility of the active metal dithionites in anhydrous organic solvents, it is also advantageous and desirable to use an additional salt as an electrolyte to promote the conductivity of the solution. Generally, it has been found that certain inorganic salts of the same active metal as used in the dithionite are satisfactory for this purpose. Specifically, it has been found that the perchlorate salts of active metals will not react with the dithionite ions, based on testing and analysis in aqueous solution. Accordingly, in the case of the preferred lithium dithionite charging agent, lithium perchlorate has proved to be very satisfactory as an ionized component of the electrolyte. While active metal bromides, such as lithium bromide, are also satisfactory electrolytes, the use of such compounds is questionable because of the undesired production of bromine. On the other hand, battery cells have been satisfactorily employed employing lithium dithionite in a saturated solution of lithium bromide in acetonitrile.

In view of the foregoing considerations, it has been determined that a preferred electrolyte solution to be used with lithium dithionite is a mixture of acetonitrile with lithium perchlorate (viz., $LiClO_4$).

A particular advantage of the battery cell and system of the present invention is that current producing operations can be carried out at ambient temperatures, that is, without heating or cooling, and at atmospheric pressure.

It is possible in an atmospheric pressure cell to have the electrolyte essentially saturated with gaseous sulfur dioxide which may be added to the system at any convenient point, for example, in the inlet conduit 46 to the circulatory chamber or, as illustrated, directly to the tank 42 through the valved conduit 86. The presence of sulfur dioxide in the electrolyte solution may also be beneficial in that the gas may assist in the removal of any free oxygen or water by reaction therewith, to thereby avoid undesired reactions with the active metal or dithionite ions.

The start up and operation of the battery system illustrated in FIGS. 1 and 2 will now be described. Initially, desired quantities of dried crystalline active metal dithionite (prepared in the manner herein described) together with dry crystalline active metal perchlorate are placed in the circulatory chamber 40, as at 62. Valving in the circulatory system, represented at 43, 47 and 55 (FIG. 1) is then opened to permit the entire system to be subjected to the purging effects of a vacuum. Specifically, a vacuum is pulled on the reservoir chamber 40 by means of a suitable vacuum pump 90, operating through the lines 92 and 94. During such operation, the valve 96 in the electrolyte solvent supply line 98 is closed, whereas the valves 93 and 95 are open. The battery system comprising the battery chamber 10 and circulatory chamber 40 are then purged in several cycles involving the pulling of an appropriate vacuum (i.e., 40 microns) with the vacuum pump 90, and alternatively introducing dry inert gas (viz., argon or nitrogen) through the valve line 98 with assistance of the pump 60. These alternative pump and purge cycles (represented by the arrows 100, 102) serve to free the circulatory system of oxygen or water vapor such as might react with the active metal dithionite. The anhydrous organic electrolyte solvent is then introduced to the vacuum outlet (through line 98 and valve 96) to the reservoir chamber 40, where it mixes with the dry chemicals in the bottom of the reservoir. Simultaneously, the organic solvent can be saturated with sulfur dioxide to insure removal of any possible remaining oxygen or water vapor.

Assuming that the dry chemicals 62 include the selected active metal dithionite together with the same active metal perchlorate, the perchlorate totally dissolves in the entering solvent to form a saturated solution. However, the active metal dithionite, being only partially soluble, will remain substantially undissolved at the bottom of the reservoir chamber, with the portions of the undissolved dithionite forming a slurry with the entering solvent. In this "filling" operation, the solvent pump 104 is operated siumltaneously with the circulatory pump 60 to distribute electrolyte solution throughout the circulatory system including the battery cell 10. During such operation, undissolved dithionite circulating as a slurry with the electrolyte will be removed from the circulating liquid in the centrifugal separator 64, and returned through the line 62 to the bottom of the reservoir chamber. When the system is completely filled, the valve 96 can be closed so that the electrolyte circulates between the battery cell 10 and reservoir chamber 40 in a more or less steady state. However, sulfur dioxide gas can be continuously metered to the system at a controlled rate, under the control of the valve 106. At this stage, the battery cell 10 is in an inert discharge state, with electrolyte solution being continuously circulated through the porous pathway between the electrodes 80 and 82, provided by the inert strands of the spacing member 84 (see arrows 110 in FIGS. 3 and 4).

At this point, the battery cell is subjected to a charging current capable of supplying the energy level required to plate the active metal onto the negative electrode (i.e., the bare metal conductor 80), while simultaneously further saturating the circulating electrolyte with sulfur dioxide released from the oxidation of the dithionite ion, at the positive electrode 82. As particularly illustrated in the enlarged detail view of FIG. 4, the active metal is deposited as a layer 120 on the bare metal conductors 80. Because of the very low internal resistance to current flow in the pathway between the electrodes 80 and 82, the plating of the active metal ion continues even though there is a very low proportion of the available dithionite material in the solution in the circulating electrolyte. By way of illustration, the electrolyte may be saturated with dithionite at less than a 5% solution, say in a 1% solution, as respects the circulating organic solvent. However, due to the continuous circulation of freshly dissolved dithionite solution through the separator 64, and into the battery cell 10, a continuous supply of alkaline metal ion is available for plating on the negative electrode 80. In this operation, it will be appreciated that the active metal plated onto the conductor 80 itself becomes the conductive layer so that the active metal ion will continue to plate onto the conductor and build up in the free space available between the strands of the inert spacer 84. Because the plating reaction takes place at the constant ambient temperature, and in the presence of the circulating medium, there is very little energy loss due to internal resistance of the battery cell, and consequently negligible heat gain even at relatively high loading.

The discharge state of the described battery cell and system is best described with respect to a particular battery cell construction based on use of lithium dithionite as the charging agent, acetonitrile as the anhydrous organic solvent, and lithium perchlorate as a dissolved electrolyte. Thus, a particular battery cell 10, designed to fit within a sealed exterior opening (cylindrical) of a submarine hull may have dimensions of the order of 20 inches in diameter and 7½ to 8 inches in thickness. The active (negative) electrode is an elongate ribbon of copper screening or perforated metal, 78 feet long, 5 inches wide and approximately 0.08 inches thick. The passive current gathering (positive) electrode is likewise formed as an elongate strip of a mixture of 80% carbon with 20% polytetrafluoroethylene which is 78 feet long, 5 inches wide and of the order of 0.08 inches in thickness. The inert spacing member between the electrodes is an elongate strip of polypropylene lattice-work screening, which similarly is approximately 78 feet long, 5 inches wide and about 0.08 inches in thickness (individual strand diameter, approx. 0.04 inches). The resulting sandwich or laminate of copper and carbon electrodes with an intermediate polypropylene spacer (78 feet long, 5 inches wide and ¼ inch thick) is arranged in a spiral extending outwardly from the central core 18 to the outer cylindrical shell 12. As illustrated in FIGS. 5 and 6, the active copper electrode 80 is connected to the outer terminal 74 by means of an outer electrode clip 75. The carbon electrode 82 is similarly connected to the inert terminal 72 by means of an inner electrode clip (not shown) positioned adjacent the central core 18.

Upon discharge of a fully charged cell of the type described (represented by plating lithium on the copper electrode to a thickness of 0.04 inches) the practical discharge capacity of the cell closely approaches the theoretical capacity, that is, 4800 ampere hours for each 785 grams of lithium dithionite. The described battery cell thus has a discharge capacity approximating 16 times the practical limit of the conventional lead-acid cell of corresponding space dimensions and weight. This is computed as follows: lithium will be plated on the negative electrode to a thickness of 0.0025 inches for each 785 grams of lithium dithionite delivered, representing 300 ampere hours. Since the available space for plating of lithium in the described battery cell is 0.04 inches, the available watt hours per pound will be:

(0.0400/0.0025) × 300 ampere hours = 4800 ampere hours

In general terms, 300 ampere hours of energy storage is equivalent to 16 watt hours per pound of available plated lithium. A total of 4800 ampere hours is therefore 16 times the limit of the conventional lead-acid cell of similar weight and dimensions.

In a particular application of the described battery cell, designed to provide a 240 volt/300 ampere hour system, 78 individual battery cells are operated in series to provide the essential propulsive power. Each cell, including battery chamber 10 and circulatory chamber 40 has a total volume of 1600 ml (cell volume 100 ml and reservoir volume 1500 ml). The electrolyte comprises 1600 ml of acetonitrile, saturated with $SO_2$, and circulating over 15 grams of $Li_2S_2O_4$ and 75 grams of $LiClO_4$ initially placed in the circulatory chamber 40. In a test sequence, involving several 10 second charge and discharge cycles to assure continuity and a 10 minute chage at 0.5 amps, discharge characteristics with respect to a 150 ohm load and a current flow of 0.02± amps, are represented in Table I below:

Table I

| Discharge Time | Discharge Voltage |
|---|---|
| 0 | 2.947 |
| 1 min. | 2.939 |
| 2 min. | 2.929 |
| 5 min. | 2.904 |
| 10 min. | 2.848 |

In general, operational characteristics were excellent, with a cell life of 1.5 hours before recharging, and a peak amperage of 300 amps.

It has been determined that the improved battery cell and system of the present invention provides many advantages. Specifically, because there is no build up or scaling within the cell, the battery cell is found to be rechargeable many times. Recharging of the cell is easily accomplished because of the presence of dissolved $SO_2$ gas within the electrolyte solution, permitting easier reversibility to the active metal dithionite. Moreover, the circulation of the electrolyte over a gross supply of solid dithionite permits a large capacity battery with battery cell size limitations which are, conversely, quite small. The battery cell is particularly advantageous in that it can be operated at constant ambient temperatures and at atmosperic pressures.

Improved battery cells employing the active metal dithionite provide a further advantage in enabling use of low atomic weight active metals such as lithium, sodium, potassium, magnesium and calcium, without concern as to problems of exposure to air or necessity of using controlled atmospheres or mineral oils in admixture with the active metal. Moreover, the charging sequence is entirely new in that the active metal is plated directly on an electrode during charging of the battery so as to be available for discharge. The battery cell thus has application for primary as well as secondary cells. Thus, following plating of the lithium on the electrode, the lithium dithionite electrolyte can be evacuated from the cell and be replaced with an electrolyte of different discharge characteristics, for example, sulfuryl chloride or thionyl chloride.

A principal advantage of the improved dithionite battery cells resides in the provision of maximum energy and current density ratios as well as power/weight ratios (generally 10 to 20 times those previously available with conventional battery cells), thus making possible for the first time the potential for battery operation and propulsion of primary vehicles and marine craft such as automobiles, trucks, power boats and submarines. Other advantages inherent in the use of the improved battery cells and systems herein disclosed will be apparent to those skilled in the art to which the invention pertains, which is not intended to be limited to the specific disclosures herein except as limited by the appended claims.

I claim:

1. An electrochemical cell comprising an electrode structure which includes an inert negative electrode of conductive material, an inert positive current-gathering electrode of conductive material, and a liquid mixture in contact with said electrodes, said liquid mixture consisting essentially of at least one substantially inert, anhydrous, organic liquid solvent having therein a charging agent selected from the active metal dithionites and mixtures thereof, said liquid mixture during the charging of said cell plating active metal of said selected active metal dithionite on said negative electrode and generating sulfur dioxide at said positive electrode, and means for continuously circulating said liquid mixture into contact with a source of said charging agent and said negative and positive electrodes during said charging of the cell.

2. An electrochemical cell as in claim 1 wherein said charging agent is lithium dithionite.

3. An electrochemical cell as in claim 2 wherein said inert negative electrode initially comprises a copper structure substantially free of the same active metal as said selected active metal dithionite.

4. An electrochemical cell as in claim 2 which includes $SO_2$ dissolved in said solvent.

5. An electrochemical cell as in claim 4 wherein said solvent is selected from acetonitrile, propylene carbonate and mixtures thereof.

6. An electrochemical cell as in claim 2 wherein said negative electrode includes a layer of active metal plated thereon from said liquid mixture.

7. An electrochemical cell as in claim 6 wherein said liquid mixture comprises an electrolyte mixture including a current-carrying solute dissolved in substantially inert, anhydrous organic liquid solvent.

8. An electrochemical cell as in claim 7 wherein said liquid mixture solvent and said solute solvent include at least one solvent in common.

9. An electrochemical cell as in claim 8 wherein said solute is lithium perchlorate, and said common solvent is selected from acetontrile, propylene carbonate and mixtures thereof.

10. An electrochemical cell as in claim 9 which includes $SO_2$ dissolved in at least one of said solvents.

11. An electrochemical cell as in claim 1 wherein said liquid mixture comprises an electrolyte mixture including a current-carrying solute dissolved in said solvent.

12. An electrochemical cell as in claim 11 wherein said solute is a salt of the same active metal as in the active metal dithionite selected as the charging agent.

13. An electrochemical cell as in claim 12 wherein said charging agent is lithium dithionite and said solute is lithium perchlorate.

14. An electrochemical cell as in claim 13 which includes $SO_2$ dissolved in said solvent.

15. An electrochemical cell as in claim 12 wherein said anhydrous organic liquid solvent is acetonitrile, said charging agent is lithium dithionite, and said solute is lithium perchlorate.

16. An electrochemical cell as in claim 12 including a source of sulfur dioxide gas and means to introduce said sulfur dioxide gas into said solvent.

17. An electrochemical cell as in claim 12 wherein said negative electrode is metallic copper.

18. An electrochemical cell as in claim 17 wherein said copper anode includes a layer of active metal plated thereon from said mixture.

19. An electrochemical cell as in claim 12 wherein said positive current gathering electrode is finely divided carbon.

20. In an electrochemical system, said system being characterized by negligible depletion of active charging agent on cycling, minimum internal resistance to current flow and substantially increased energy storage capacity, the combination of: a first means defining a battery chamber, a second means defining an auxiliary circulatory chamber, first liquid conduit means connecting an outlet from said battery chamber to an inlet to said circulatory chamber, means for transfer of liquid through said first liquid conduit means, second liquid conduit means connecting an outlet from said circulatory chamber to an inlet in said battery chamber, means in said second liquid conduit means for separation of entrained solid materials from liquid circulating therethrough and to return the same to said circulatory chamber, an electric battery cell in said battery chamber, said battery cell including an elongated negative electrode disposed adjacent to an elongated positive current-gathering electrode such that a passage is provided therebetween for the flow of liquid, a quantity of charging agent selected from the active metal dithionites and mixtures thereof in said circulatory chamber, and at least one nonaqueous solvent substantially filling the circulatory space within said battery and circulatory chambers and said liquid conduit means, said transfer means serving to circulate said nonaqueous solvent over said quantity of charging agent to dissolve fresh portions thereof for substantially continuous delivery through said solid separation means to said battery chamber and cell.

21. An electrochemical system as in claim 20 wherein said means for separation of solid materials from said circulating electrolyte is a centrifugal separator.

22. An electrochemical system as in claim 20 wherein said adjacent relationship of the elongated active electrode and said elongated passive current-gathering electrode in said battery cell is substantially a spiral configuration.

23. An electrochemical system as in claim 20 wherein said battery cell comprises an active electrode in the form of an elongate length of copper screen closely adjacent a passive current gathering electrode in the form of an elongate carbon strip, said elongate electrodes being spaced from one another by an elongate inert porous spacer.

24. An electrochemical system as in claim 23 wherein said elongate inert spacer comprises a fibrous, substantially inert plastic material 25. An electrochemical system as in claim 20 wherein said liquid comprises at least one anhydrous organic liquid solvent, and said charging agent is a member selected from the group consisting of the active metal dithionites and mixtures thereof.

26. An electrochemical system as in claim 25 wherein said charging agent is lithium dithionite.

27. An electrochemical system as in claim 26 wherein said liquid includes a current-carrying solute.

28. An electrochemical system as in claim 27 wherein said current-carrying solute is lithium perchlorate.

29. An electrochemical system as in claim 28 wherein said solvent is selected from acetonitrile, propylene carbonate, and mixtures thereof.

30. An electrochemical system as in claim 29 wherein said solvent includes $SO_2$ dissolved therein.

31. An electrochemical system as in claim 26 which includes means for providing a potential to said system to plate active metal onto said negative electrode.

32. An electrochemical system as in claim 20 wherein said charging agent is selected from active metal dithionites and mixtures thereof, and said negative electrode initially comprises a copper structure substantially free of the same active metal as said charging agent.

33. An electrochemical system as in claim 32 wherein said copper structure has plated thereon an active metal layer from said charging agent upon application of a potential to said system.

34. An electrochemical system as in claim 33 which induces a solute and SO₂ dissolved in said solvent.

35. An electrochemical system as in claim 34 wherein said solute is lithium percholarate, and said solvent is selected from acetonitrile, propylene carbonate and mixtures thereof.

36. A secondary electrochemical cell comprising an electrode structure which includes an inert negative electrode of conductive material, an inert positive current-gathering electrode of conductive material, and a liquid mixture in contact with said electrodes, said liquid mixture consisting essentially of at least one substantially inert, anhydrous organic liquid solvent having therein a charging agent selected from the active metal dithionites and mixtures thereof, said charging agent being in a partially dissolved and suspended state so as to be available to both said negative and positive electrodes, said liquid mixture upon application of a potential to said cell plating active metal of said selected active metal diothionite on said negative electrode and generating sulfur dioxide at said positive electrode.

37. An electrochemical cell as in claim 36 wherein said charging agent is lithium dithionite.

38. An electrochemical cell as in claim 37 wherein said inert negative electrode initially comprises a copper structure substantially free of the same active metal as said selected active metal dithionite.

39. An electrochemical cell as in claim 37 which includes SO₂ dissolved in said solvent.

40. An electrochemical cell as in claim 39 wherein said solvent is selected from acetonitrile, propylene carbonate and mixtures thereof.

41. An electrochemical cell as in claim 37 wherein said negative electrode includes a layer of active metal plated thereon from said liquid mixture.

42. An electrochemical cell as in claim 41 wherein said liquid mixture comprises an electrolyte mixture including a current-carrying solute dissolved in substantially inert, anhydrous organic liquid solvent.

43. An electrochemical cell as in claim 42 wherein said liquid mixture solvent and said solute solvent include at least one solvent in common.

44. An electrochemical cell as in claim 43 wherein said solute is lithium perchlorate, and said common solvent is selected from acetonitrile, propylene carbonate and mixtures thereof.

45. An electrochemical cell as in claim 44 which includes SO₂ dissolved in at least one of said solvents.

46. An electrochemical cell as in claim 36 wherein said liquid mixture comprises an electrolyte mixture including a current-carrying solute dissolved in said solvent.

47. An electrochemical cell as in claim 46 wherein said solute is a salt of the same active metal as in the active metal dithionite selected as the charging agent.

48. An electrochemical cell as in claim 47 wherein said charging agent is lithium dithionite and said solute is lithium perchlorate.

49. An electrochemical cell as in claim 48 which includes SO₂ dissolved in said solvent.

50. An electrochemical cell as in claim 47 wherein said anhydrous organic liquid solvent is acetonitrile, said charging agent is lithium dithionite, and said solute is lithium perchlorate.

51. An electrochemical cell as in claim 47 including a source of sulfur dioxide gas and means to introduce said sulfur dioxide gas into said solvent.

52. An electrochemical cell as in claim 47 wherein said negative electrode is metallic copper.

53. An electrochemical cell as in claim 52 wherein said copper anode includes a layer of active metal plated thereon from said mixture.

54. An electrochemical cell as in claim 47 wherein said positive current gathering electrode is finely divided carbon.

55. A continuous method of operating an electrochemical system during the charging and discharging thereof in such fashion as to minimize internal resistance to current flow while substantially increasing the energy storage capacity of the system, comprising the steps of continuously circulating a nonaqueous electrolyte through an elongated passage between closely spaced adjacent conductive materials forming electrode surfaces for a battery cell in said system, simultaneously and continuously circulating said electrolyte from the battery cell to a circulatory chamber containing a solid charging agent selected from the active metal dithionites and mixtures thereof, said charging agent being at least partially soluble in said electrolyte, continuously discharging electrolyte containing dissolved charging agent from said circulatory chamber and subjecting the same to centrifugal action to separate entrained solid charging agent from said circulating electrolyte, and returning the circulating electrolyte with freshly dissolved charging agent therein to the elongated passage in said battery cell, said electrolyte comprising a mixture of at least one organic liquid solvent containing a current-carrying solute and said charging agent.

56. A method as in claim 55 wherein said current-carrying solute comprises a member selected from the group consisting of active metal perchlorates and mixtures thereof.

57. A method as in claim 55 wherein sulfur dioxide is continuously introduced into said circulating electrolyte to dehydrate the same and to enhance the operation of said electrochemical system.

58. A method for manufacturing an electrochemical current-producing cell in the charged state, such cell including an inert negative electrode structure of conductive material, an inert positive current-gathering electrode of conductive material and an electrolyte in contact with said electrodes, the steps of providing said negative electrode structure substantially free of an electrochemically consumable active metal, providing electrolyte solution in the form of an anhydrous fluid comprising at least one organic liquid solvent containing therein a dissolved and suspended charging agent selected from the group consisting essentially of the active metal dithionites and mixtures thereof into contact with said electrodes, said fluid being presented to said negative and positive electrodes in such fashion as to provide a substantially continuous supply of said dissolved and suspended charging agent to said electrodes, and applying a potential to said cell at an energy level and for a time sufficient to plate active metal of said selected active metal dithionite on said negative electrode to provide said plated active metal in a form available for use during discharge of the electrochemical current producing cell.

59. A method as in claim 58 wherein said charging agent is lithium dithionite.

60. A method as in claim 59 wherein said solvent contains $SO_2$ dissolved therein.

61. Method as in claim 60 wherein said solvent is selected from acetonitrile, propylene carbonate and mixtures thereof.

62. Method as in claim 58 which includes the step of circulating said anhydrous solvent containing said active metal dithionite into contact with said electrodes.

63. Method as in claim 58 which includes a current-carrying solute in said solvent.

64. Method as in claim 63 wherein said solute is a salt of the same active metal as in said active metal dithionite.

65. A method as in claim 64 wherein said active metal dithionite is lithium dithionite, and said current-carrying solute is selected from active metal perchlorates and mixtures thereof.

66. A method as in claim 65 wherein said organic liquid solvent is selected from acetonitrile, propylene carbonate and mixtures thereof, and said current-carrying solute is lithium perchlorate.

67. A method as in claim 66 wherein said solvent has $SO_2$ dissolved therein.

68. A method as in claim 58 which includes the steps of removing said active metal dithionite after said plating step, and introducing an electrolyte into contact with said electrodes.

69. A method as in claim 65 wherein said removal step includes withdrawing said solvent containing said active metal dithionite.

70. A method as in claim 68 wherein said electrolyte comprises a solvent having a solute therein, and said solute is a salt of the same active metal as said active metal dithionite.

71. A method as in claim 70 wherein said active metal dithionite is lithium dithionite, said solute is lithium perchlorate, and said electrolyte solvent is selected from acetonitrile propylene carbonate and mixtures thereof.

72. A method as in claim 71 wherein said solvent has $SO_2$ dissolved therein.

* * * * *

UNITED STATES PATENT AND TRADEMARK OFFICE
CERTIFICATE OF CORRECTION

PATENT NO. : 4,154,902
DATED : May 15, 1979
INVENTOR(S) : Ralph E. Schwartz

It is certified that error appears in the above–identified patent and that said Letters Patent are hereby corrected as shown below:

Claim 9, line 3, "acetontrile" should be --acetonitrile--

Claim 35, line 2, "percholarate" should be --perchlorate--

Signed and Sealed this

Eleventh Day of September 1979

[SEAL]

Attest:

LUTRELLE F. PARKER

*Attesting Officer*    *Acting Commissioner of Patents and Trademarks*